US011882631B2

(12) United States Patent
Zijlman et al.

(10) Patent No.: US 11,882,631 B2
(45) Date of Patent: Jan. 23, 2024

(54) LIGHT SOURCE DRIVER FOR A LUMINAIRE

(71) Applicant: SIGNIFY HOLDING B.V., Eindhoven (NL)

(72) Inventors: Theo Gerrit Zijlman, Tilburg (NL); Henricus Marius Joseph Maria Kahlman, Dongen (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 17/918,136

(22) PCT Filed: Apr. 19, 2021

(86) PCT No.: PCT/EP2021/060023
§ 371 (c)(1),
(2) Date: Oct. 11, 2022

(87) PCT Pub. No.: WO2021/213953
PCT Pub. Date: Oct. 28, 2021

(65) Prior Publication Data

US 2023/0140677 A1 May 4, 2023

(30) Foreign Application Priority Data

Apr. 23, 2020 (EP) .................................... 20171025

(51) Int. Cl.
*H05B 45/18* (2020.01)
*H05B 45/14* (2020.01)
*H05B 45/325* (2020.01)
*H05B 45/3725* (2020.01)

(52) U.S. Cl.
CPC ............. *H05B 45/18* (2020.01); *H05B 45/14* (2020.01); *H05B 45/325* (2020.01); *H05B 45/3725* (2020.01)

(58) Field of Classification Search
CPC ........ H05B 45/18; H05B 45/14; H05B 45/30; H05B 45/325; H05B 45/3725
See application file for complete search history.

(56) References Cited

U.S. PATENT DOCUMENTS 3,609,457 A 9/1971 Squiers
2011/0074302 A1 3/2011 Draper et al.
2012/0025715 A1* 2/2012 Picciotto ................ H05B 45/28 362/235
2012/0026761 A1 2/2012 Young
(Continued)

FOREIGN PATENT DOCUMENTS

EP 3319401 A1 5/2018
EP 3386273 A1 10/2018
(Continued)

*Primary Examiner* — Abdullah A Riyami
*Assistant Examiner* — Syed M Kaiser

(57) ABSTRACT

A light source driver for a light source of a luminaire. The disclosure proposes to monitor a parameter, responsive to or a cause of a temperature change in a resistive element to facilitate determination of whether the light source driver is compatible with an AC supply. The resistive element in connected in series between the rectifying arrangement, of the light source driver, and the energy storage capacitor for storing charge that powers the light source.

15 Claims, 3 Drawing Sheets

(56) References Cited

U.S. PATENT DOCUMENTS

| | | | | |
|---|---|---|---|---|
| 2012/0081004 | A1 | 4/2012 | Wilmoth et al. | |
| 2014/0269799 | A1 * | 9/2014 | Ortiz | H01S 5/0428 372/38.02 |
| 2015/0237700 | A1 * | 8/2015 | Woytowitz | H05B 45/382 315/307 |

FOREIGN PATENT DOCUMENTS

| | | | | |
|---|---|---|---|---|
| GB | 1445711 | A | 8/1976 | |
| JP | 2005253195 | A | 9/2005 | |
| WO | WO-2016176063 | A1 * | 11/2016 | H05B 45/24 |
| WO | WO-2018206430 | A1 * | 11/2018 | |

* cited by examiner

LIGHT SOURCE DRIVER FOR A LUMINAIRE

CROSS-REFERENCE TO PRIOR APPLICATIONS

This application is the U.S. National Phase application under 35 U.S.C. § 371 of International Application No. PCT/EP2021/060023, filed on 19, April 2021, which claims the benefit of European Patent Application No. 20171025.8, filed on 23, April 2020. These applications are hereby incorporated by reference herein.

FIELD OF THE INVENTION

The present invention relates to the field of lighting installations, and in particular to the field of luminaires for lighting installations.

BACKGROUND OF THE INVENTION

There is an ever increasing demand for highly configurable and dimmable lighting installations, e.g. for use in a consumer or industrial environment. There is a particular need for luminaires (i.e. light emitting devices) that are compatible with a wide variety of different power sources/supplies and/or controllers without affecting their operation, to facilitate "hassle free" connection of a new luminaire to an existing power source/supply.

In particular, there is a desire for luminaires to work according to the so-called robustness and compatibility principle. When operating according to this principle, the lifetime and operation of a luminaire should not be affected by connection to a wide variety of different dimmers or AC power sources. In other words, a luminaire should have an unaffected lifetime when placed on an AC power source and operate without flicker and/or other light output artefacts. If a luminaire can operate according to these principles, it can be considered "compatible" with the dimmer or other AC power source.

Currently, to meet these requirements, luminaires are designed with high power factor (PF) architectures, that typically do not comprise electrolytic capacitors. These high power factor architectures benefit with improved dimmer robustness and compatibility, but are more expensive and complex than low power factor architectures, which typically make use of one or more electrolytic capacitors.

There is an ongoing desire to reduce the costs and complexity of luminaires.

SUMMARY OF THE INVENTION

The invention is defined by the claims.

According to examples in accordance with an aspect of the invention, there is provided a light source driver for powering a light source of a lighting arrangement. The driver comprises: a rectifying arrangement configured to receive AC power from an AC power supply, and output a rectified voltage for powering the light source; an energy storage capacitor configured to receive and store the rectified voltage for supplying the light source; a series connection of a resistive element and the energy storage capacitor, coupled in parallel with outputs of the rectifying arrangement; and a sensing element configured to monitor a temperature of the resistive element, to thereby facilitate determination of whether the light source driver is compatible with the AC power supply.

The present disclosure recognizes that some AC power supplies can provide extremely high (peak) currents. For example, an AC power supply which performs phase cut dimming can cause a high current to appear in the light source driver, and particularly in the resistive element connected in series with the energy storage capacitor (e.g. for the purposes of current shaping to modify the power factor of the light source driver).

These high currents can significantly decrease the lifetime of components of the light source driver, and in particular, the lifetime of the resistive element due to overheating. Thus, the presence of high current in the light source driver could mean that the light source driver is not sufficiently robust or compatible with respect to the AC power supply.

The present disclosure proposes to monitor a parameter responsive to, or a cause of, a temperature change of the resistive element. This may comprise directly monitoring a temperature in the vicinity of the resistive element (e.g. at a pad directly connected to the resistive element or the resistive element itself), a voltage drop across the resistive element or a current flowing through the resistive element. This parameter can be used to determine whether the light source is compatible (e.g. sufficiently robust) with respect to the AC power supply.

As previously noted, the resistive element can be useful for current shaping, to control and/or improve a power factor of a light source driver. Thus, preferably, the resistive element is a current shaping resistor.

Preferably, the light source driver further comprises a switch in parallel with the resistive element (R1), wherein the switch is arranged to close when the current through the resistive element (R1) is below a threshold.

When the light source driver is not exposed to extreme current peaks because the light source driver is not coupled to a phase-cut dimmer, it may be desirable that after start-up of the light source driver, the resistive element is shunted to improve the power efficiency of the light source driver. Preferably, the shunting is performed when an inrush current flowing through the energy storage capacitor, and hence the resistive element, has passed and the current through the resistive element has dropped below a threshold.

Preferably, the temperature sensing element is configured to directly monitor a temperature responsive to a change in temperature of the resistive element, e.g. a temperature of the resistive element or a temperature in the vicinity of the resistive element. In other words, the temperature sensing element may comprise a temperature sensitive element (such as a thermistor) in thermal contact with the resistive element).

In some embodiments, the LED luminaire further comprises a control element configured to control a current flowing through the resistive element responsive to the parameter monitored by the temperature sensing element.

Thus, a control element can be provided to control the current flowing through the resistive element, thereby facilitating controllable robustness of the light source driver. Provision of the control element can increase a compatibility of the light source driver for use at different dimming magnitudes and/or with different AC sources. Controllability of the current flowing through the resistive element means that the temperature of the resistive element can be controlled, allowing the longevity/lifetime of the resistive element to be improved (e.g. through avoiding high temperatures).

Optionally, the control element reduces a current flowing through the resistive element in response to the parameter monitored by the temperature sensing element breaching a first predetermined threshold. This embodiment provides a mechanism for reducing excess current (e.g. which occurs when the first predetermined threshold is breached) in the resistive element, to thereby improve the lifetime of the light source driver. The first predetermined threshold may be a threshold of the parameter that indicates the lifetime of the resistive element or light source driver will be affected (by the corresponding change in temperature) by more than a predetermined and/or permissible amount (e.g. according to a set of standards or desired commercial properties). For example, certain standards may set the maximum permissible or advised temperature of a resistive element to a predetermined level, and the first predetermined threshold may be a threshold that indicates that the maximum permissible/advisable temperature has been reached/breached.

As another example, a resistive element may have a temperature rating (e.g. according to manufacturer's specifications). The first predetermined threshold may correspond to a threshold that indicates this temperature rating has been met or exceeded. The temperature rating may indicate a maximum allowable temperature (recommended by the manufacturer), a recommended maximum temperature or a fixed percentage (e.g. 90%) thereof.

In other words, the first predetermined threshold may be dependent upon a temperature rating of the resistive element or recommended maximum temperatures for the resistive element.

Preferably, the first predetermined threshold is selected to correspond to a temperature of the resistive element of 140° C. For example, where the temperature sensing element comprises a thermistor in thermal contact with the, the current through the resistive element may be reduced in response to the thermistor reaching a temperature of between 95 to 100° C.

The control element may be configured to control a current flowing through the resistive element by controlling the current flowing from the energy storage capacitor to the light source. In other words, the control element may be configured to control one or more properties (e.g. modulation, magnitude and so on) of the current provided to the light source by the energy storage capacitor in order to control the current through the resistive element (electrically connected to the energy storage capacitor). This provides a highly customizable mechanism for controlling the average current through the resistive element.

In particular, the control element may be configured to control the average current flowing from the energy storage capacitor to the light source responsive to the parameter monitored by the temperature sensing element.

In at least one example, the control element controls the average current provided by the energy storage capacitor to the light source using a pulse width modulation technique. In other words, the control element may use a pulse width modulation technique to control the average current provided to the light source. This mechanism facilitates control of the average current that is highly adaptive.

In some embodiments, the control element comprises a buck and/or boost converter configured to control the current flowing from the energy storage capacitor to the light source, wherein control of the buck and/or boost converter is responsive to the parameter monitored by the temperature sensing element.

A buck and/or boost converter is a conventional mechanism for controlling the current between an energy storage capacitor and a light source, and it commonly used to improve a power factor of the light source driver.

Thus, the buck/boost converter may control the current (and voltage) provided to the light source. The operation of the buck/boost converter (if present) is responsive to the parameter monitored by the temperature sensing device. A buck/boost converter provides a simple and widely available mechanism for controlling a current supplied to a light source (by the energy storage capacitor), and therefore of the current through the resistive element connected in series with the energy storage capacitor.

In some examples, the control element comprises a microcontroller configured to control the operation of the buck and/or boost converter responsive to the parameter monitoring by the temperature sensing element. The microcontroller may be configured to partially comprise the temperature sensing element.

The microcontroller may be configured to control the operation of the buck and/or boost converter using a pulse width modulation technique. That is, the microcontroller may be able to toggle an operation (or manually control an operation) of the buck and/or boost converter using a pulse width modulation technique.

In some embodiments, the control element is configured to control the current flowing from the energy storage capacitor to the light source responsive to a voltage at a current sense node; and the temperature sensing element is configured to directly control a voltage at the current sense node responsive to the parameter monitored by the temperature sensing node.

Thus, in some examples, the operation of the control element may be configured to control a current flowing from the energy storage capacitor to the light source based on a voltage at a particular node (a current source node). This may comprise, for example, appropriately controlling the current so that a voltage at the particular node is kept within a predetermined range.

Where the control element comprises a buck and/or boost converter, this may comprise appropriately controlling the switch of such a converter to maintain the voltage at the particular node, or the voltage at the particular node defining the peak/RMS current supplied to the light source.

Of course, the operation of the buck and/or boost converter may be overridden (e.g. by a microcontroller).

Preferably, the temperature sensing element comprises a thermistor responsive to a change in temperature. This provides a simple and low-cost mechanism for monitoring a temperature at the resistive element.

The thermistor may be positioned to monitor a temperature at a solder pad of the resistive element.

In at least one embodiment, the light source driver further comprises an output element configured to provide a user-perceptible output, wherein the output element is configured to control the user perceptible output responsive to the parameter monitored by the temperature sensing element. This provides a user with an indication that facilitates determination of whether or not the light source driver (or luminaire containing the same) is compatible with the AC power supply.

Optionally, the output element is configured to adjust a user perceptible output in response to the parameter monitored by the temperature sensing element breaching a predetermined threshold.

The energy storage capacitor may, for example, comprise an electrolytic capacitor. However, other capacitor types could be used, such as a ceramic capacitor and/or a film(-based) capacitor. The resistive element comprises any suitable resistive or impedance arrangement, e.g. a single resistor. The light source driver may be adapted for use with any suitable light source, such as an LED arrangement (e.g. an LED string).

According to an aspect of the invention, there is provided a luminaire comprising a light source driver as herein described and a light source powered by the light source driver, such as an LED arrangement (e.g. an LED string).

According to an aspect of the invention, there is provided a method of operating a light source driver for a light source of a lighting arrangement. The method comprises: using a rectifying arrangement to receive AC power from an AC power supply, and output a rectified voltage for powering the light source; using an energy storage capacitor to receive and store the rectified voltage for supplying the light source; using a resistive element to connect the output of the rectifying arrangement to the energy storage capacitor; and using a temperature sensing element to monitor a parameter responsive to, or a cause of, a change in temperature of the resistive element, to thereby facilitate determination of whether the light source driver is compatible with the AC power supply.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

Figure 1:
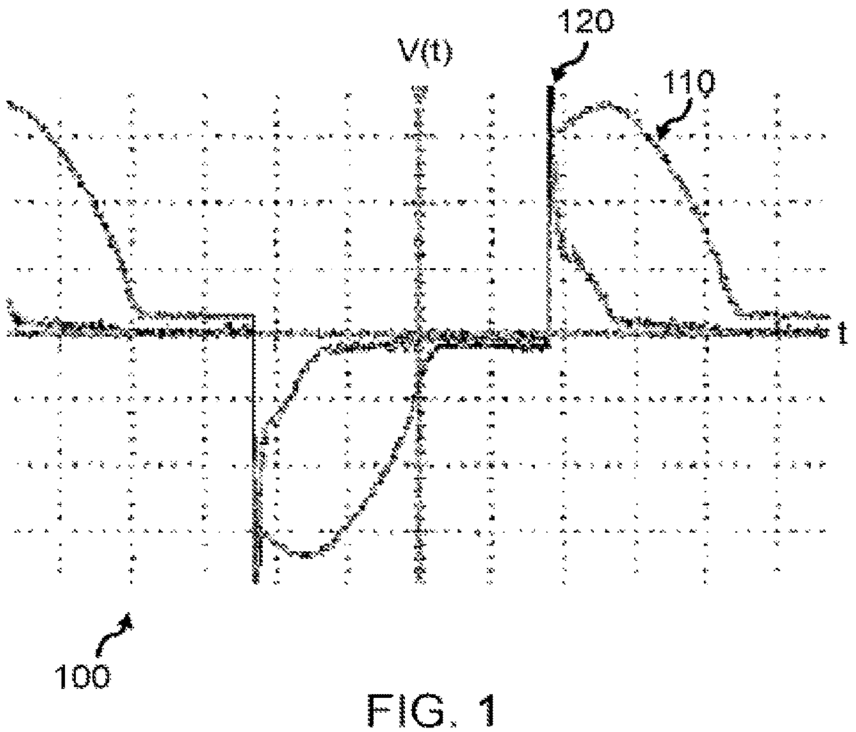
FIG. 1 illustrates the effect of phase cut dimming on the voltage provided by the AC power supply to the lamp driver.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

The invention provides a light source driver for a light source of a luminaire. The disclosure proposes to monitor a parameter, responsive to or a cause of a temperature change in a resistive element to facilitate determination of whether the light source driver is compatible with an AC supply. The resistive element in connected in series with the energy storage capacitor that receives a rectified voltage for storing charge that powers the light source.

An underlying concept of the invention is based on the realization that a lifetime of a light source driver is impacted by an overheating of the resistive element connected in series with the energy storage capacitor. By monitoring a parameter responsive to a change in temperature, or a cause of the change in temperature, identification of potential overheating can be performed—to thereby determine that an AC supply powering the light source driver is not compatible with the light source driver (i.e. causes overheating).

Other underlying concepts propose methods for overcoming the problem of overheating of this resistive element, to thereby improve the compatibility and lifetime of the light source driver.

Embodiments of the invention can be employed in any suitable lighting installation.

FIG. 1 provides a graph 100 illustrating the effect of phase cut dimming on the voltage provided by an AC supply (undergoing phase cut dimming) to a light source driver.

An exemplary light source driver (not shown) comprises a rectifying arrangement and an energy storage capacitor (for powering a light source). The input of the rectifying arrangement receives the voltage provided by the AC supply and the output of the rectifying arrangement is connected to the energy storage capacitor, A resistive element may be connected in series with the energy storage capacitor, e.g. for at least the purposes of current shaping.

A first waveform 110 illustrates a voltage level provided by the AC supply at a first dimming level (at a low level of dimming or "deep dimming"—i.e. a dimming level intended for low intensity light output, e.g. 90 degrees phase cut). A second waveform 120 illustrates an input current level provided by the AC supply at the first dimming level. As illustrated, the phase cut dimming causes a large spike in the input current, thereby causing a high peak voltage and current.

If a second, higher dimming level (i.e. a dimming level intended for a light output of a greater intensity) were to be used, the peak voltage/current at the second dimming level 120 would be less than at the higher dimming level 110.

This is a result of the phase cut dimming process.

This greater peak voltage (at low dimming levels) induces a greater current in the resistive element connected in series with the energy storage capacitor that receives the (rectified) AC supply. The greater current increases the temperature of this resistive element (due to increased heat dissipation), which results in a life-time reduction of the resistive element and therefore of the light source driver.

The present disclosure recognizes that an ability to monitor a parameter responsive to (or a cause of) a temperature rise, and controlling/reducing the current flowing through the resistive element in response thereto can increase the life-time of the light source driver.

Figure 2:
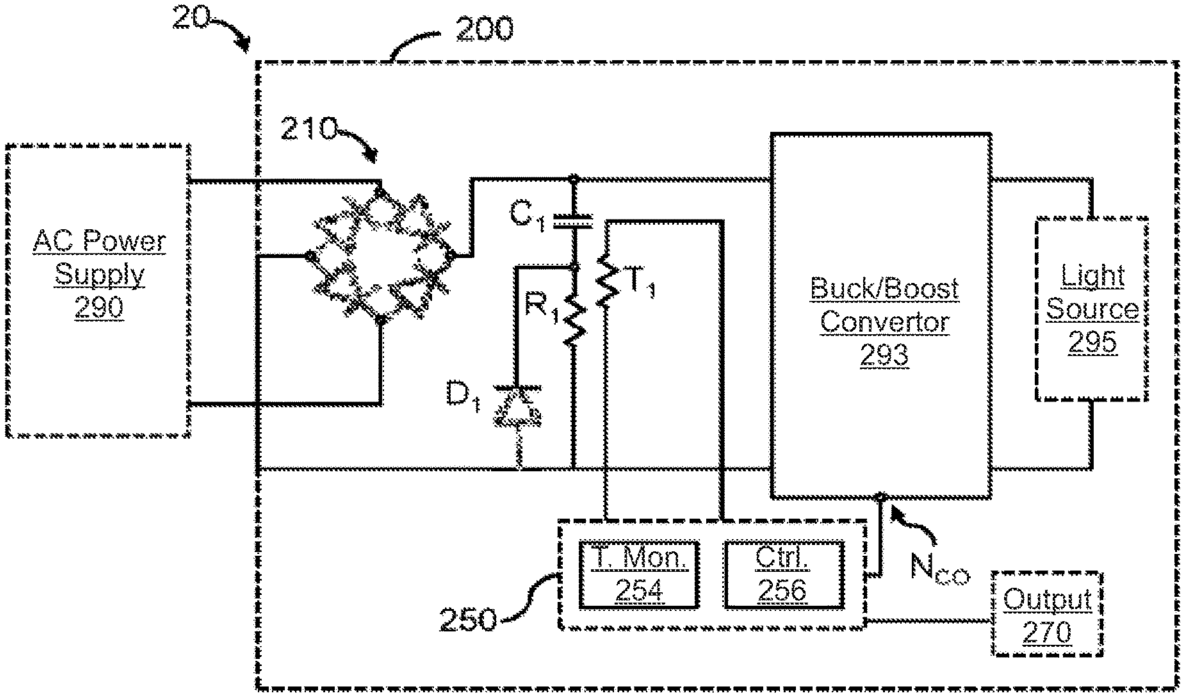
FIG. 2 illustrates a light source driver according to a first embodiment.

FIG. 2 illustrates a light source driver 200 according to an embodiment of the invention. The light source driver is configured for powering a light source 295 of a luminaire 20, itself an embodiment of the invention, for a lighting arrangement.

The light source driver 200 comprises a rectifying arrangement 210 configured to receive AC power from an AC power supply 290, and output a rectified voltage for powering the light source 295. The illustrated rectifying arrangement 210 is a full-wave diode bridge rectifier. However, the rectifying arrangement 210 may be replaced by any other suitable rectifying arrangement, e.g. a half-wave diode bridge rectifier, a center-tap rectifier and so on.

The light source driver 200 further comprises an energy storage capacitor $C_1$ configured to receive and store the rectified voltage for supplying the light source. The energy storage capacitor smooths the rectified voltage, to provide a DC-like voltage for power the light source, as would be well known to the skilled person. The energy storage capacitor $C_1$ may therefore be alternatively labelled a smoothing capacitor.

The energy storage capacitor may, for example, be an electrolytic capacitor. However, other capacitor types could be used, such as a ceramic capacitor and/or a film(-based) capacitor. The energy storage capacitor $C_1$ could be replaced by a plurality of energy storage capacitors (e.g. arranged in parallel), as would be appreciated by the skilled person.

The light source driver 200 further comprises a resistive element $R_1$, which is connected in series with the energy storage capacitor $C_1$. The resistive element $R_1$ is illustrated as being connected between the energy storage capacitor $C_1$ and a ground or reference voltage, but may be alternatively positioned to connect the energy storage capacitor to the output of the rectifying arrangement 210. There may be a series connection of the resistive element $R_1$ and the energy storage capacitor (C1), coupled in parallel with outputs of the rectifying arrangement (210, 410).

The resistive element $R_1$ aids in current shaping of the rectified voltage, helping to smooth a current provided to the light source 295. Current shaping processes are well known to the skilled person.

The light source driver 200 further comprises an (optional) diode $D_1$, which aids in current shaping.

The light source driver 200 further comprises a temperature sensing element $T_1$, 254. The temperature sensing element is configured to monitor a parameter responsive to, or a cause of, a change in temperature of the resistive element.

This may, for example, comprise directly measuring the temperature of the resistive element, e.g. by monitoring a current through a thermistor $T_1$ in thermal contact with the resistive element.

In the illustrated example, the temperature sensing element comprises a temperature monitoring module 254 (which may be formed as an aspect of a microcontroller 250 for the light source driver 200) and a temperature sensor $T_1$. The temperature sensor is adapted to be responsive to a change in temperature of the resistive element, which is detected by the temperature monitoring module 254. In other words, the temperature monitoring module detects a response of the temperature sensor to a change in temperature of the resistive element.

The temperature sensor $T_1$ may, for example, comprise a thermoresistor, a thermocouple or any other suitable sensor responsive to a change in temperature.

The temperature sensor $T_1$ may, as illustrated, be thermally connected to one end (e.g. a solder-pad) of the resistive element $R_1$. This allows for direct and accurate monitoring of the temperature of the resistive element.

By monitoring a parameter responsive to (or a cause of) a change in temperature of the resistive element $R_1$, the temperature sensing element 254, $T_1$ facilitates determination of whether the light source driver is compatible with the AC power supply (e.g. compatible with a certain dimming level of an AC power supply). In particular, the temperature sensing element 254, $T_1$ determines a characteristic that identifies whether a lifetime of the light source driver 200 will be negatively affected by the AC power supply (e.g. by a particular dimming level of the AC power supply).

In some embodiments, the light source driver 200 may be configured to adapt the operation of the light source driver 200 to facilitate improved compatibility of the light source driver with the AC power supply.

The light source driver may comprise a control element 256 that controls a current flowing through the resistive element response to the parameter monitored by the temperature sensing element.

In particular, the light source driver may comprise a control element 256 that reduces a current flowing through the resistive element in response to the parameter monitored by the temperature sensing element 254, $T_1$ breaching a first predetermined threshold. The first predetermined threshold may depend upon a rating (e.g. a recommended/maximum temperature rating, a recommended/maximum current rating or a recommended/maximum voltage drop rating) of the resistive element, and so may differ depending upon implementation details.

In the illustrated embodiment, the control element 256 is embodied as an aspect of a microcontroller 250 that can control the average current flowing from the energy storage capacitor to the light source using a buck and/or boost convertor 293 (e.g. a buck converter, a boost converter or a buck-boost converter). The control element 256 may be embodied in a same microcontroller 250 as an aspect of the temperature sensing element 254, $T_1$.

The operation of a buck, boost or buck-boost converter is well known to the skilled person. Generally, a buck, boost or buck-boost converter is configured to controllably connect and disconnect a DC power source (here, the energy storage capacitor $C_1$) to an output load, whilst maintaining a generally constant current supply (and voltage) to the output load.

A buck and/or boost converter may comprise a current sense node, and be configured to maintain a voltage at the current sense node to lie within a predetermined range (e.g. employing hysteresis to do so). As another example, the voltage at the current sense node may define the peak/RMS current supplied to the light source.

The control element 256 may be configured to control an average current provided by the energy storage capacitor to the light source using a pulse width modulation technique. In particular, the control element 256 may be configured to control an operation of the buck and/or boost converter 293 using a pulse width modulation technique (e.g. to alternately activate and deactivate the buck and/or booster converter, e.g. alternately permit or prevent the buck and/or boost converter from receiving power from the energy storage capacitor $C_1$). This approach provides a well-researched and adaptive method for controlling the power/current flowing from the energy storage capacitor to the light source.

Thus, the buck and/or boost converter may comprise a control input node $N_{CO}$, e.g. a pulse width modulation node, and may be configured to control an operation of the buck and/or boost converter responsive to a signal at the control input node (e.g. provided by the microcontroller 250). For example, the buck and/or boost convertor 293 may alternative activate and deactivate the other components of the buck and/or boost converter responsive to the signal at the control input node. In particular, the buck and/or boost converter may alternately permit or prevent the buck and/or boost converter from receiving power from the energy storage capacitor $C_1$ responsive to a signal at the control input node.

Other methods of controlling or modulating current flowing from the energy storage capacitor to the light source will be apparent to the skilled person, e.g. may be embodied in hardware or the like.

In preferable examples, the control element 256 is configured to reduce the average current flowing through the resistive element, e.g. by appropriately (pulse-width) modulating current flowing from the energy storage capacitor to the light source, in response to the temperature sensed by the temperature sensor $T_1$ exceeding a predetermined threshold. The predetermined threshold may depend upon a temperature rating of the resistive element, and so may differ depending upon implementation details.

By reducing an average current through the resistive element, the amount of heat dissipated by the resistive element is reduced, thereby reducing a temperature of the resistive element and improving its lifetime.

As the proposed approach for reducing the average current may occur only at deep dimming levels (see FIG. 1), the impact of the reduction in average power/current to the light source 295 is minimal.

The light source driver 200 may comprise an output element 270 configured to provide a user-perceptible output, such as a visual output. The output element is configured to control the user perceptible output responsive to the parameter monitored by the temperature sensing element.

In this way, the output element 270 may provide a user-perceptible indication whether the light source driver 200 is compatible with the AC power supply. Examples of a suitable user-perceptible output include a visual output, e.g. an output of an LED, or an audio output, e.g. an output of a buzzer. The output element may therefore comprise one or more LEDs and/or one or more buzzers, although other suitable visual/audible outputs will be apparent to the skilled person.

Preferably, the output element is configured to adjust a user perceptible output in response to the parameter monitored by the temperature sensing element breaching a predetermined threshold, e.g. a threshold that indicates that the lifetime of the light source driver 200 will be affected. By way of example, passing the predetermined threshold may trigger the output element to provide a user perceptible output, such as a light.

The output element 270 may be controlled by a microprocessor 250, which may be the same microprocessor as that used to monitor the parameter responsive to, or a cause of, a temperature change of the resistive element $R_1$.

In some examples, instead of itself being configured to provide a user-perceptible output, the output element 270 may be configured to communicate with an external user interface (e.g. a mobile device, such as a cell phone or smart phone). Thus, the output element may be configured to transmit a (wireless) signal to an external user interface, the signal indicating whether the light source driver is compatible with the AC power supply, based on the parameter monitoring by the temperature sensing element (e.g. if a monitored parameter indicates that a temperature of the resistive element has breached or is predicted to breach a predetermined threshold).

The external user interface may be configured to modify a user-perceptible alert responsive to the signal received from the output element 270.

This mechanism provides a system for alerting a user as to an incompatibility of the light source driver with the AC source.

The output element 270 may communicate with the external user interface (not shown) using any suitable communication protocol, e.g. over the internet, a wireless network or the like. Suitable wireless communication protocols that may be used to communicate with the external device or interface include an infrared link, Zigbee, Bluetooth, a wireless local area network protocol such as in accordance with the IEEE 802.11 standards, a 2G, 3G or 4G telecommunication protocol, and so on. Other formats will be readily apparent to the person skilled in the art.

A light source driver 200 may omit the control element 256 or the output element 270, depending upon the desired implementation. In other words, a light source driver 200 may comprise the control element 256 and/or the output element 270.

The light source 295 may comprise an LED arrangement, such as an LED string. Other light sources 295 are also contemplated, e.g. a halogen bulb, but are less preferred for reasons of efficiency.

The microcontroller 250 may be configured to also receive power from the energy storage capacitor. Similarly, the output element 270, if present, may receive power from the energy storage capacitor.

The microcontroller 250 may be configured to perform further tasks, and control a current flowing from the energy storage capacitor to the light source to carry out these tasks.

For example, the microcontroller may be configured to receive a user input or control input (e.g. from a wireless signal), and control a pulse width modulation of the buck and/or boost converter responsive to the user input or control input (e.g. to further control a dimming of the light source 295).

As another example, the microcontroller may itself take on some of the tasks previously performed by the buck and/or boost converter 293, e.g. perform the current sensing and control the buck and/or boost converter in response thereto (e.g. using the control input node $N_{CO}$), so that an operation of the buck and/or boost converter is dependent upon the microcontroller 250 (e.g. rather than directly sensing a current itself).

Other operations for the microcontroller will be apparent to the skilled person.

Figure 3:
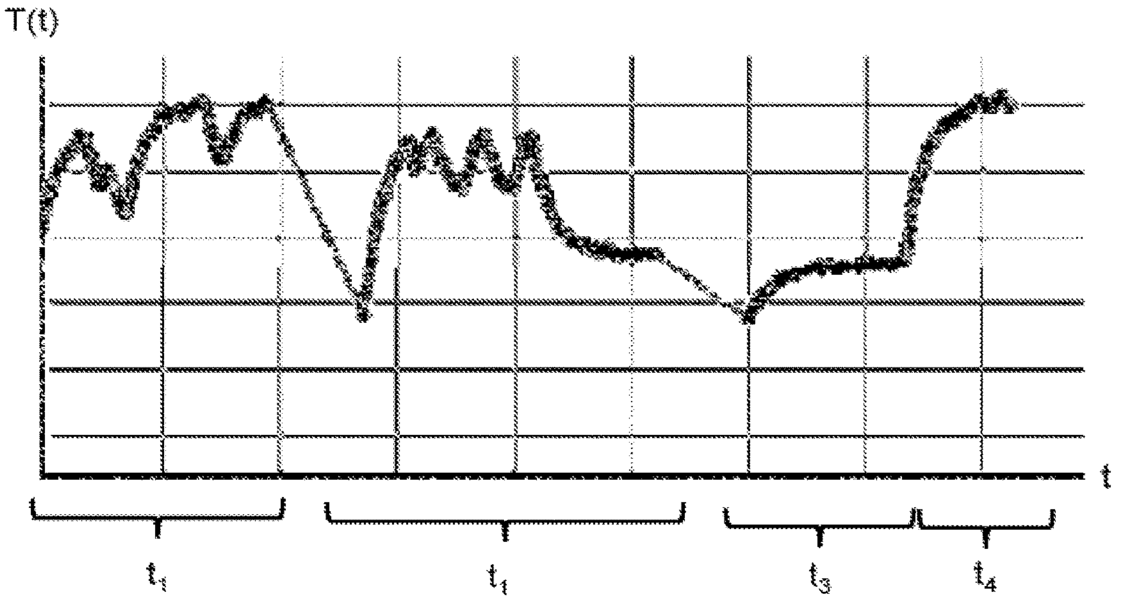
FIG. 3 illustrates an effect of a light source driver according to an embodiment.

FIG. 3 illustrates the impact of controlling the current flowing from the energy storage capacitor to the light source on the temperature of the resistive element $R_1$. The x-axis t illustrates time (for four different scenarios), with the y-axis T(t) illustrating a temperature of the resistive element $R_1$ at a particular point in time.

In a first scenario, illustrated by a first time period $t_1$, a pulse width modulation, controlled by the microcontroller, of the current flowing from the energy storage capacitor to the light source is held at 70%. In a second time period, the pulse width modulation is reduced to a lower value of 65%.

In particular, for the first time period, the buck and/or boost converter (that controls a current flowing from the energy storage capacitor to the light source) is permitted to draw power from the energy storage capacitor for 70% of the time. For the second time period, it is only permitted to draw power for 65% of the time.

It can be seen that a lower pulse width modulation (i.e. a lower average current flowing from the energy storage capacitor to the light source) results in a lower temperature of the resistive element.

FIG. 3 also illustrates the impact of phase cut dimming performed by an AC supply on the temperature T(t) of the resistive element.

In a third scenario, illustrated by the third time period $t_3$, no phase cut dimming is performed by the AC supply. In a fourth scenario, illustrated by the fourth time period $t_4$, phase cut dimming is performed by the AC supply. The performance of the phase cut dimming results in a higher temperature of the resistive element.

Thus, FIG. 3 illustrates how phase cut dimming increases the temperature of the resistive element (compare $t_3$ to $t_4$), but also demonstrates how controlling the current flowing from the capacitive element to the light source can reduce the temperature of the resistive element, by reducing the average current flowing through the resistive element (compare $t_1$ to $t_2$).

At low dimming levels, the impact of reducing the average current flowing to the light source, to reduce a (average) temperature of the resistive element, is minimal (as the brightness of light is no longer a priority, and lower brightness levels are acceptable).

Figure 4:
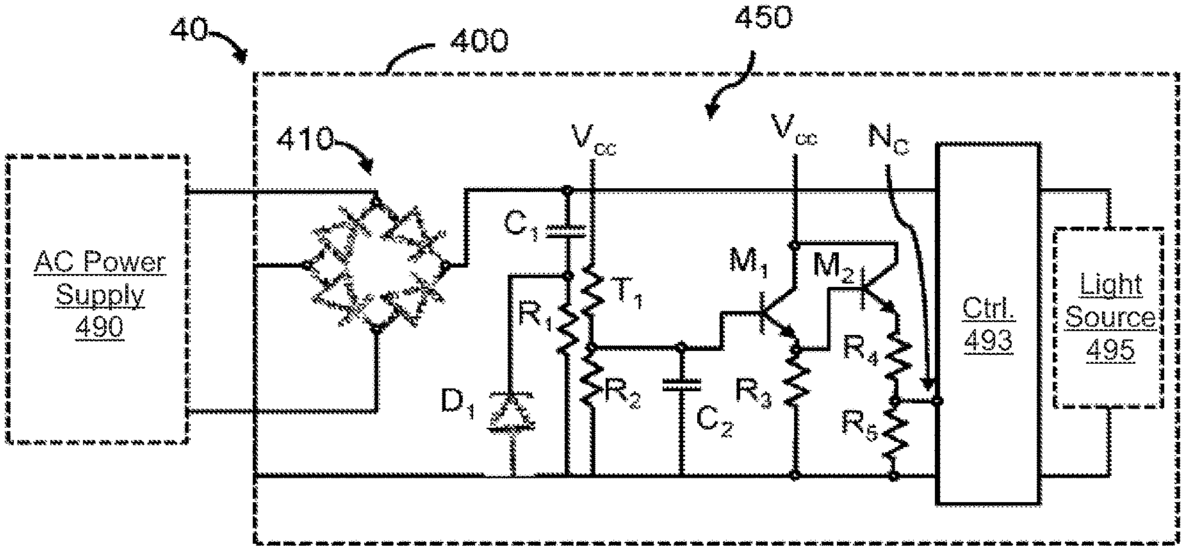
FIG. 4 illustrates a light source driver according to a second embodiment.

FIG. 4 illustrates a light source driver 400 according to another embodiment of the invention. The light source driver 400 is configured for powering a light source 495 of a luminaire 40, itself an embodiment of the invention, for a lighting arrangement.

Unless expressly stated otherwise, corresponding features of the light source driver 400 or the luminaire 40 may be embodied as previously described with reference to FIG. 2.

The light source driver 400 comprises a rectifying arrangement 410, which rectifies a voltage provided by an AC power supply, 490. Suitable embodiments of a rectifying arrangement 410 have been previously described. The light source driver further comprises an energy storage capacitor $C_1$ and a resistive element $R_1$, which may also be embodied as previously described. The light source driver 200 further comprises the (optional) diode $D_1$.

The light source driver 400 further comprises a temperature sensing element 450. The temperature sensing element is adapted to monitor a temperature of the resistive element $R_1$, again using a thermistor.

A control element 493 is adapted to control the current through the resistive element $R_1$ responsive to the parameter monitored by the temperature sensing element 450. In particular, the control element 493 here comprises a buck and/or boost converter that is configured to control a power/current provided to the light source 495 based on a voltage at a current sense node $N_C$ (e.g. to maintain a voltage at the current sense node within a predetermined range or where a voltage defines a "peak" current of the buck and/or boost voltage).

In this embodiment, rather than a current through the resistive element $R_1$ being controlled via a microcontroller, the current is controlled by the temperature sensing element directly controlling the buck and/or boost converter by controlling a voltage at the current sense node $N_C$.

Thus, rather than being implemented in software (e.g. via an appropriately configured microcontroller), the current through the resistive element $R_1$ is controlled via hardware.

The control element 493 is thereby adapted to control the current through the resistive element $R_1$ responsive to the parameter monitored by the temperature sensing element 450. The control element 460 thereby performs a mechanism of directly controlling the temperature of the resistive element (e.g. of a solder-pad of the series resistor) via current control.

The temperature sensing element 450 comprises a temperature sensitive element (e.g. a thermistor) $T_1$.

As is well known in the art, a resistance through a thermistor varies responsive to temperature. Appropriately positioning of the thermistor, e.g. in thermal contact with the resistive element $R_1$ or a solder pad thereof, enables the temperature of the resistive element to be monitored.

The present embodiment proposes to use a voltage divider arrangement to monitor the voltage across the thermistor $T_1$, e.g. by connecting the thermistor in series with a first additional resistive element $R_2$ (connected between the thermistor and a ground/reference voltage). The thermistor $T_1$ is connected between a high voltage $V_{cc}$ (e.g. 3.3V or the output of the rectifying arrangement 410) and the first additional resistive element $R_2$. The voltage across the first additional resistive element $R_2$ varies based on the resistance of the thermistor (and therefore the temperature of the resistive element $R_1$).

The skilled person would be readily capable of providing a high voltage $V_{CC}$ powered by the AC supply 490 (e.g. using a voltage output of the rectifying arrangement 410).

The voltage across the first additional resistive element $R_2$ controls a conductivity of a first transistor $M_1$, i.e. a gate of the first transistor $M_1$ is connected to the node between the thermistor $T_1$ and the first additional resistive element $R_2$. A smoothing capacitor $C_2$ may be positioned to smooth a voltage provided to the gate of the first transistor $M_1$.

In this way, the first transistor $M_1$ is controlled to be conductive when the temperature across the thermistor exceeds a predetermined threshold. The value of the thermistor $T_1$ and/or the first additional resistive element $R_2$ may be selected to appropriately control the gate of the first transistor $T_1$ (e.g. apply an appropriate voltage bias) when the temperature at the resistive element $R_1$ (i.e. a temperature of the thermistor) reaches an acceptable threshold.

The drain or collector of the first transistor $M_1$ is connected to the high voltage $V_{cc}$. The source or emitter of the first transistor $M_1$ is connected to a first end of a second additional resistive element $R_3$. The second end of the second additional resistive element may be connected to a ground or reference voltage.

The first transistor and the second additional resistive element $R_3$ together appropriately bias the voltage across the first additional resistive element and serve as an electric buffer.

The temperature sensing element 450 may further comprise a second transistor $M_2$ having a gate or base connected to the source or emitter of the first transistor $M_1$, a drain or collector connected to the high voltage $V_{cc}$ and a source or emitter connected to a first end of a third additional resistive element $R_4$. A second end of the third additional resistive element $R_4$ is connected to a first end of a fourth additional resistive element $R_5$, the second end of which may be connected to a ground or reference voltage.

The second end of the third additional resistive element is also coupled to the current sense node $N_C$.

The second transistor $M_1$ is controlled to be conductive when the current through the second additional resistive element $R_3$ exceeds a predetermined threshold.

For the purposes of the present disclosure, a transistor may comprise any suitable transistor such as a bipolar junction transistor or a MOSFET. Other suitable transistors will be apparent to the skilled person.

The skilled person will appreciate that the second, third and fourth additional resistive elements $R_3$, $R_4$, $R_5$, the smoothing capacitor $C_2$, and the transistors $M_1$, $M_2$ may be omitted in some embodiments through appropriate selection of the first additional resistive element $R_2$.

Embodiments may comprise components from both described embodiments of the invention, e.g. for at least the purposes of redundancy and/or combined/improved operation. In particular, a voltage across the first additional resistive element $R_1$ (for the light source driver 400) may be provided to a microcontroller (not shown) that controls the buck and/or boost converter 493 in a manner analogous to the microcontroller of the light source driver 200.

As another example, the light source driver 400 may comprise the output element described earlier.

Figure 5:
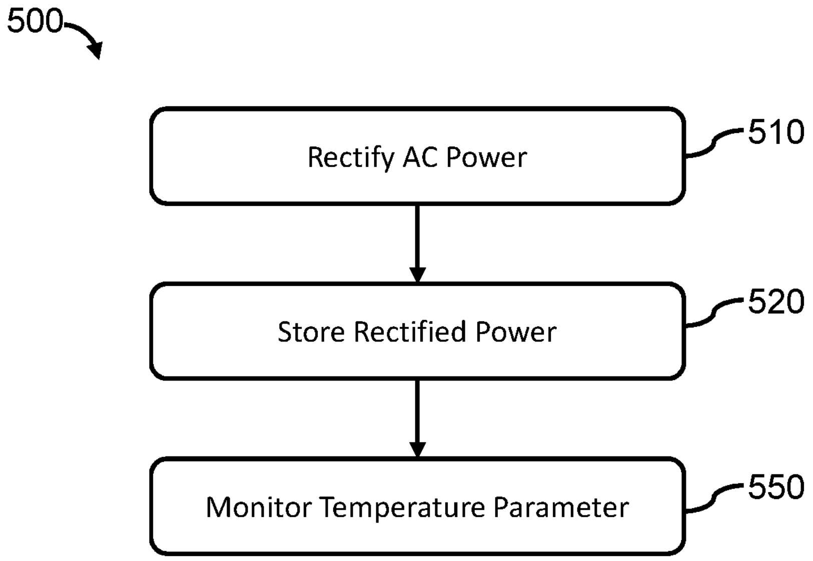
FIG. 5 illustrates a method according to an embodiment.

FIG. 5 illustrates a method 500 of operating a light source driver for a light source of a lighting arrangement.

The method comprises a step 510 of using a rectifying arrangement to receive AC power from an AC power supply, and output a rectified voltage for powering the light source.

The method 500 also comprises a step 520 of using an energy storage capacitor to receive and store the rectified voltage for supplying the light source. This step can be performed by using a resistive element to connect the output of the rectifying arrangement to the energy storage capacitor.

The method 500 also comprises a step 550 of using a temperature sensing element to monitor a parameter responsive to, or a cause of, a change in temperature of the resistive element, to thereby facilitate determination of whether the light source driver is compatible with the AC power supply.

The skilled person will appreciate that the method may be adapted to carry out any embodiment or concept of the invention as described with reference to the embodied light source drivers.

Although embodiments have been generally described in which the temperature sensing element comprises a thermistor (or other temperature sensitive element), other suitable sensors may be used. In particular, a temperature through the resistive element is response to a current to through the resistive element.

It may therefore be possible to sense a current passing through the resistive element and control the current through the resistive element in response thereto (e.g. to limit the current through the resistive element). This may be performed by setting a voltage at a current sense node to be equal to the voltage across the resistive element (e.g. using a buffer element or the like).

The temperature sensing element may therefore comprise a current sensing element configured to monitor a current passing through the resistive element. Information on this current may be used to control a current through the resistive element.

As an example, with reference back to FIG. 4, the thermistor $T_1$ (coupled between $V_{CC}$ and the first additional resistive element $R_2$) could be replaced by a sensing resistive element connected between a node (located between the energy storage capacitor $C_1$ and the resistive element $R_1$) and the first additional resistive element $R_2$. This can act as a voltage divider that provides a voltage (at the node between the sensing resistive element and the first additional resistive element $R_2$) responsive to a current through the resistive element $R_1$. This voltage can be connected to the current sense node (e.g. via a buffering and biasing arrangement) to control a current that flows from the energy storage capacitor $C_1$ to the light source 495 (thereby controlling the current through the resistive element $R_1$). A threshold for this control could be set with the reference voltage $V_{CC}$.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. If the term "adapted to" is used in the claims or description, it is noted the term "adapted to" is intended to be equivalent to the term "configured to". Any reference signs in the claims should not be construed as limiting the scope.

The invention claimed is:

1. A light source driver for powering a light source of a lighting arrangement, the light source driver comprising:

a rectifying arrangement configured to receive AC power from an AC power supply, and output a rectified voltage for powering the light source;

an energy storage capacitor (configured to receive and store the rectified voltage for supplying the light source;

a series connection of a resistive element and the energy storage capacitor, coupled in parallel with outputs of the rectifying arrangement; and a temperature sensing element configured to monitor a temperature of the resistive element to thereby facilitate determination of whether the light source driver is compatible with the AC power supply.

2. The light source driver of claim 1, further comprising a switch in parallel with the resistive element, wherein the switch is arranged to close when the current through the resistive element is below a threshold.

3. The light source driver of claim 1, further comprising a control element configured to control a current flowing through the resistive element responsive to the parameter monitored by the temperature sensing element.

4. The light source driver of claim 3, wherein the control element reduces the current flowing through the resistive element in response to the parameter monitored by the temperature sensing element breaching a first predetermined threshold.

5. The light source driver of claim 3, wherein the control element is configured to control a current flowing through the resistive element by controlling the current flowing from the energy storage capacitor to the light source.

6. The light source driver of claim 5, wherein the control element controls the average current provided by the energy storage capacitor to the light source using a pulse width modulation technique.

7. The light source driver of claim 4, wherein the control element comprises a buck and/or boost converter configured to control the current flowing from the energy storage capacitor to the light source, wherein control of the buck and/or boost converter is responsive to the parameter monitored by the temperature sensing element.

8. The light source driver of claim 7, wherein the control element comprises a microcontroller configured to control the operation of the buck and/or boost converter responsive to the parameter monitoring by the temperature sensing element.

9. The light source driver of claim 8, wherein the microcontroller controls the operation of the buck and/or boost converter using a pulse width modulation technique.

10. The light source driver of claim 3, wherein:

the control element is configured to control the current flowing from the energy storage capacitor to the light source responsive to a voltage at a current sense node; and the temperature sensing element is configured to directly control a voltage at the current sense node responsive to the parameter monitored by the temperature sensing node.

11. The light source driver of claim 1, wherein the temperature sensing element comprises a thermistor responsive to a change in temperature.

12. The light source driver of claim 1, further comprising an output element configured to provide a user-perceptible output, wherein the output element is configured to control the user perceptible output responsive to the parameter monitored by the temperature sensing element.

13. The light source driver of claim 12, wherein the output element is configured to adjust a user perceptible output in response to the parameter monitored by the temperature sensing element breaching a predetermined threshold.

14. A lighting arrangement comprising the light source driver of claim 1 and a light source configured to draw power from the energy storage capacitor.

15. A method of operating a light source driver for a light source of a lighting arrangement, the method comprising:

using a rectifying arrangement to receive AC power from an AC power supply, and output a rectified voltage for powering the light source;

using an energy storage capacitor to receive and store the rectified voltage for supplying the light source;

connecting a resistive element in a series connection with the energy storage capacitor, wherein the series connection is coupled in parallel with outputs of the rectifying arrangement; and using a temperature sensing element to monitor a temperature of the resistive element to thereby facilitate determination of whether the light source driver is compatible with the AC power supply.

* * * * *